United States Patent [19]

Hudecek

[11] 3,947,279

[45] Mar. 30, 1976

[54] THERMALLY CRYSTALLIZABLE GLASSES POSSESSING PRECISION CONTROLLED CRYSTALLIZATION AND FLOW PROPERTIES AND PROCESS OF PRODUCING SAME

[75] Inventor: Carl J. Hudecek, Toledo, Ohio

[73] Assignee: Owens-Illinois, Inc., Toledo, Ohio

[22] Filed: Mar. 29, 1974

[21] Appl. No.: 456,562

Related U.S. Application Data

[63] Continuation of Ser. No. 211,656, Dec. 23, 1971, abandoned, which is a continuation of Ser. No. 814,156, April 7, 1969, abandoned.

[52] U.S. Cl. ............. 106/39.6; 106/39.7; 106/39.8; 106/47 R
[51] Int. Cl.$^2$........................ C03C 3/22; C03C 3/12
[58] Field of Search....... 106/39.6, 39.7, 39.8, 47 R, 106/47 Q

[56] References Cited
UNITED STATES PATENTS

| | | | |
|---|---|---|---|
| 2,483,647 | 10/1949 | Kjillgren............................ | 23/301 R |
| 2,889,952 | 6/1959 | Claypoole.......................... | 106/39.5 |
| 3,061,664 | 10/1962 | Kegg.................................... | 106/53 |
| 3,250,631 | 5/1966 | Lusher................................. | 106/53 |
| 3,291,586 | 12/1966 | Chapman, Jr. et al. ........... | 106/39.5 |
| 3,462,252 | 8/1969 | Veres.................................. | 106/39.5 |
| 3,951,167 | 8/1960 | Kegg et al......................... | 106/39.5 |

OTHER PUBLICATIONS

McMillan, P. W., *Glass Ceramics*, Academic Press, London and N.Y., 1964, pp. 32–34, 38–43.
Hing, W., "Vitroceram," Silikat Tech. 10, 119–122 (1959).
Money, G. W., *Properties of Glass*, Second Edition, Waverly Press Inc., Baltimore, Md., 1954, p. 29.
Forbes, W. A., "Solder Glass Seals in Semiconductor Packaging," Glass Tech., Vol. 8, No. 2, Apr. 1967.
Rindone, G. E., *Influence of Platinum Nucleaction on Crystallization of a Lithium Silicate Glass*, Jacs, Jan. 1956, pp. 41–42.

*Primary Examiner*—Patrick P. Garvin
*Assistant Examiner*—Mark Bell
*Attorney, Agent, or Firm*—Richard B. Dence; E. J. Holler

[57] ABSTRACT

A thermally crystallizable glass of predominantly lead-zinc borate composition is disclosed which is composed of a homogeneous admixture of finely comminuted particles of thermally crystallizable glass and essentially fully crystallized glass particles in a ratio of about 1–10, or more preferably 2–7, parts by weight of crystallized glass particles to one million parts by weight of uncrystallized glass particles and which, in its finely comminuted state, possesses an overall particle size distribution such that it is uniformly composed of particles which are essentially entirely of –100 U.S. Series Sieve screen size and such that between about 65–78 weight percent of such particles are of –325 U.S. Series Sieve screen size. The thermally crystallizable glass composition is produced by a process involving the steps of providing a quantity of uncrystallized chips of crystallizable glass having a thickness of about 20–25 mils, and a quantity of essentially fully crystallized glass having a particle size ranging between about –20 and +80 U.S. Series Sieve screen size; reducing the particle size of the uncrystallized glass and fully crystallized to a particle size range wherein essentially all of the uncrystallized glass and fully crystallized glass particles are less than 100 U.S. Series Sieve screen size and wherein between about 65–78 percent by weight of the uncrystallized glass and fully crystallized glass particles are less than 325 U.S. Series Sieve screen size; blending the fully crystallized glass particles together with the uncrystallized glass particles in a ratio of between about 100–225 parts by weight of crystallized glass particles to one million parts by weight of uncrystallized glass particles to produce a uniform "master blend" of finely comminuted, crystallized and uncrystallized glass particles. The master blend is then used for blending with uncrystallized particles of thermally crystallizable glass having a composition similar to that of the master blend and having a particle size such that essentially all of the uncrystallized particles are of –100 U.S. Series Sieve screen size and such that between about 65–78 percent by weight are of –325 U.S. Series Sieve screen size; the ratio of master blend to uncrystallized glass particles being selected to produce a homogeneous resulting blend or "product blend" composed of from about 1–10, or more preferably 2–7, parts of fully crystallized glass particles to each one million parts of uncrystallized glass particles.

6 Claims, No Drawings

THERMALLY CRYSTALLIZABLE GLASSES POSSESSING PRECISION CONTROLLED CRYSTALLIZATION AND FLOW PROPERTIES AND PROCESS OF PRODUCING SAME

This is a Continuation of application Ser. No. 211,656, filed Dec. 23, 1971, now abandoned, which in turn is a continuation of Ser. No. 814,156 filed Apr. 7, 1969, now abandoned, which are relied upon and the entire disclosure and specifications of which are hereby incorporated by reference.

BACKGROUND OF THE INVENTION

Thermally crystallizable, or as otherwise stated, thermally devitrifiable glass compositions have heretofore attained a stature of substantial useful significance in numerous and varied areas of technology and commercial application. For example, such glasses are commonly utilized as a sealant or bonding medium for application to and with a wide variety of materials such as, among others, glasses, metals, ceramics, and the like, and in he fabrication of cathode-ray tubes, microcircuits, insulated wires, etc. In consequence of the estensive employment of these thermally devitrifiable, or thermally crystallizable, glasses for sealing and bonding purposes they are also referred to frequently as being sealing glasses, or solder glasses; and when employed for such purposes are ordinarily utilized in a finely comminuted form either with or without additional temporary binders or adhesives.

In a more definitive sense, however, these crystallizable glasses are of a character such that, as initially prepared they are in a non-crystalline state and possess many of the attributes and characteristics of vitreous glasses. However, unlike common or ordinary vitreous glasses, thermally crystallizable glasses, as they will hereinafter be referred to and such as are contemplated within the intendment of the present invention, also possess the unusual capability of being thermally converted into a generally monolithic, essentially crystalline body composed of about 90% or more of well-integrated crystallized glass. In the latter crystallized condition such glasses exhibit many advantageous characteristics which are not exhibited in the vitreous condition. For example, to name a few, such advantageous characteristics include greatly increased physical stength and durability, as well as, very importantly, greatly increased resistance to strength diminution during progressive elevation of temperature. Thus, briefly stated, glasses of the character herein contemplated are those which, by analogy, are unlike ordinary vitreous glasses in that they are capable of being thermally converted from a vitreous condition to a predominantly crystalline condition when exposed for a time interval of approximately 60 minutes duration to temperatures in the range of approximately 60°C. above the fiber softening-point temperature of the vitreous glass.

Due to the wide variety of specific commercial applications utilizing thermally crystallizable glasses, the specific requisite properties of such glasses are often tailored, or modified, to meet specific needs of a given situation of use and to enhance the attainment of a specific desired result. For example, thermally crystallizable glasses are avilable having compositions individually tailored to provide fiber softening-point temperatures commensurate with the specific needs of the user. Also, the inclusion of various compositional constituents for the purposes, among others, of tailoring the thermal expansion and contraction properties, thermal conductivity and dielectric properties, and chemical durability of the resultant crystallized glass are extensively known in the art. For example, as indicated in U.S. Pat. No. 3,250,631, issued to Kenneth G. Lusher and assigned to the assignee of the present invention, inert refractory metal oxides may be included in a thermally crystallizable glass composition for the specific purpose of individually tailoring or modifying the thermal expansion characteristics thereof without appreciably affecting such other characteristics as the sealing temperature and flow characteristics of the glass. Similar practices of modifying or tailoring thermally crystallizable glass compositions are further evident in U.S. Pat. No. 3,291,586 wherein mixtures of finely divided thermally non-crystallizable glass and finely divided thermally crystallizable glass are employed together to restrict the extent of overall crystallization occurring during the thermal crystallization process. According to other known concepts copper oxide may be included to provide electrical conductivity or, as disclosed in U.S. Pat. No. 3,389,458, constituents such as $TiO_2$ may be utilized to enhance the dielectric properties of the resultant thermally crystallized glass. Thus, while the broad concept of modifying or tailoring various individual characteristics of thermally crystallizable glasses is known, and while warp and means are known for modifying or tailoring certain properties and characteristics thereof; the problems of providing a thermally crystallizable glass possessing precisely modifiable and controllable rates of crystallization and flow has, so far as is known, remained as a problem which is generally common to most all thermally crystallizable glasses including such thermally crystallizable glasses as those mentioned above having other individually tailored or modified characteristics.

In keeping with the foregoing, it is important to bear in mind that, irrespective of the particular composition of the thermally crystallizable glass or the particular processing technique or procedure employed in thermally crystallizing the same, proper and efficient process control is ordinarily dependent upon the crystallization and flow rates or characteristics of the glass in order to ensure that the processing techniques for thermally crystallizing the glass, once having been properly developed and effectively established, may be regularly employed in the course of standardized production procedures to effect a continually reproducible, high quality product unaffected by variations in the crystallization and flow characteristics of the thermally crystallized glass.

Of no less importance is the time-temperature control factor which is commonly a governing factor in processing steps and operations employing thermally crystallizable glass compositions. For example, many processes wherein thermally crystallizable glass compositions are utilized are restricted to the employment of critically precise time-temperature limitations which if not maintained are productive of a non-acceptable product. To be suitable for use in such processes, the thermally glass composition must be capable of exhibiting precisely predictable thermal crystallization and flow rates compatible with the precise time-temperature limitations of such processes. Otherwise stated, many processes otherwise especially well-suited for and having need for the utilization of thermally crystallizable glass compositions have heretofore avoided the use of thermally crystallizable glass compositions because of processing limitations which are not subject to the extent of variation necessary to accommodate and off-set variations in the rates of crystallization and flow commonly occurring in thermally crystallizable glass compositions of even the most exacting uniformity heretofore otainable.

Accordingly, it is a principal objective of the present invention to provide a thermally crystallizable glass in a finely comminuted form in which it may be conveniently utilized in a wide variety of commercial applications and yet possess precisely predictable properties of crystallization and flow during the thermal crystallization thereof.

Another objective of the present invention is the provision of a thermally crystallizable glass which, in addition to satisfying the foregoing objectives is capable of use as a "master blend" to precisely alter the rates of crystallization and flow of other thermally crystallizable glasses of similar composition during thermal crystallization thereof.

According to another aspect of the present invention, it is an objective to provide a method of producing a thermally crystallizable glass composition capable of attaining the foregoing objectives.

Another objective, in keeping with this latter aspect of the present invention, is the provision of a method whereby large quantities of essentially uncrystallized particles of thermally crystallizable glass may be produced in uniform finely comminuted form and by the uniform dispersion therein of from 1 – 10 parts per million of crystallized glass be tailored to possess precise predeterminable rates of thermal crystallization and flow.

A further and more specific objective of the present invention is the provision of a method for providing a "master blend" of finely comminuted particles of thermally crystallizable and thermally crystallized glass for use in controlling the crystallization and flow characteristics of other thermally crystallizable glasses of similar composition and which is characterized by the steps of providing a quantity of uncrystallized chips of thermally crystallizable glass; providing a quantity of finely comminuted particles of thermally crystallized glass, admixing the crystallized glass particles with the uncrystallized glass chips in a ratio of between about 100 and 225 parts of crystallized glass particles to one million parts of uncrystallized glass chips; reducing the particle size of the admixed chips of uncrystallized glass and the particles of crystallized glass to a particle size wherein essentially all of the admixed particles are of −100 mesh screen size and such that 65–78% by weight are of −325 mesh screen size; uniformly blending the admixed particles of crystallized and uncrystallized glass to thereby form a "master blend"; thereafter blending the master blend with a further quantity of finely comminuted, uncrystallized particles of thermally crystallizable glass in a ratio providing a uniform blend of between about 1 and 10, parts of fully crystallized glass particles per million parts of uncrystallized glass particles.

In accordance with one aspect of the invention, the foregoing objectives are attained by providing an exceedingly uniform blend composed of finely comminuted, uncrystallized particles of thermally crystallizable glass and finely comminuted particles of fully crystallized glass in a ratio such that the crystallized particles represent only between about 1 and 10 parts per million parts of the uncrystallized particles present in the resultant blend. The method of attaining a uniform blending of such a minute quantity of crystallized glass particles is exceedingly important and constitutes another aspect of the invention.

In carrying out the method aspect of the invention, it has been found that a very high degree of uniformity can be effectively accomplished by precisely controlling the particle size of both the crystallizable and the crystallized components of the glass and by combining such particle size control with a step-wise controlled blending.

In this latter respect, a quantity of thermally crystallizable glass is prepared in the form of thin uncrystallized chips having a thickness of about 20–25 mils. The chips are then admixed, comminuted and uniformly blended together with crystallized particles of thermally crystallizable glass. The comminution and blending is preferably accomplished by combining the chips of frangible uncrystallized glass with crystallized glass particles having a particle size ranging between about −20 and +80 U.S. Series Sieve screen size and in a ratio of between about 100 to 225 parts by weight of crystallized glass particles to one million parts by weight of uncrystallized glass chips. Thereafter the comminution and blending may be preferably carried out concurrently in a suitable mill, such as a pebble mill. The milling and blending of the crystallized glass particles and uncrystallized chips is continued sufficiently to form a uniform blend and particle size distribution in which essentially all of the particles will pass through a −100 U.S. Series Sieve screen and such that between about 65 and 78 percent by weight thereof will pass through a −325 U.S. Series Sieve screen. The milled blend which constitutes a master blend or control blend is then in suitable condition to be further blended with other large quantities of finely comminuted, uncrystallized particles of thermally crystallizable glass similar in character to the constituent oxide composition of the uncrystallized particle portion of the master blend and in a ratio to provide from about 1-10 parts by weight of crystallized glass particles to one million parts by weight of uncrystallized glass particles in the final blend or so-called "product blend."

Other objects, advantages and aspects of the present invention, together with the specific nature thereof, will become readily apparent to those ordinarily skilled in the art from the following detailed description, wherein by way of example only, several preferred embodiments of the invention are described in specific detail.

DESCRIPTION OF THE PREFERRED EMBODIMENTS

While the concepts of the present invention will be clearly recognizable as being adaptable to the making of thermally crystallizable glasses of generally all types, it has been found that particularly advantageous significance is achieved with respect to thermally crystallizable glasses commonly referred to as thermally crystallizable, solder glasses and especially those having a composition predominantly composed of the oxides of lead, boron and zinc. Exemplary of preferred lead-zinc borate solder glasses of this character are those glasses which are prepared initially in a vitreous state and which have constituent oxide compositions falling within the following ranges:

TABLE I

| CONSTITUENTS | PERCENT BY WEIGHT |
|---|---|
| PbO | 70 – 82 |
| $B_2O_3$ | 5 – 15 |
| ZnO | 7 – 20 |
| $SiO_2$ | 1 – 10 |
| $Al_2O_3$ | 0 – 5 |
| Other compatible glass forming constituents (with no single constituent exceeding 10 percent by weight) | 0 – 17 |

The other compatible glass forming constituents which ordinarily may be present, dependng upon the particular ultimate characteristics desired, are such glass forming constituents, among others, as $SiO_2$, $SnO_2$, BaO, CuO, fluorides, NaO, CaO, $K_2O$, $Al_2O_3$, $Bi_2O_3$, $Li_2O$, CdO and $Fe_2O_3$. The term glass-forming constituents as used herein, is, of course, intended to embrace the broader concept of such term in that it is intended to include not only those oxides which have the properties of forming glasses of and by themselves when cooled from a molten condition, but also those oxides which are of the type which are found in the interstices of the glass network or which modify the final properties of the glass.

Typically representative compositions of thermally crystallizable glasses falling within the compositional range set forth above are, among others, depicted in Table II following:

TABLE II

| Constituents | COMPOSITIONS (PERCENT BY WEIGHT | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| PbO | 74.99 | 79.50 | 75.92 | 71.25 | 71.22 | 71.22 | 76.00 | 71.25 | 71.25 | 71.25 | 71.25 | 76.32 | 74.20 |
| $B_2O_3$ | 8.26 | 7.70 | 9.25 | 9.98 | 9.95 | 9.95 | 9.06 | 9.98 | 9.98 | 9.98 | 9.98 | 8.84 | 8.39 |
| ZnO | 12.62 | 10.00 | 12.83 | 15.86 | 15.83 | 15.83 | 12.84 | 15.86 | 15.86 | 15.86 | 15.86 | 12.84 | 8.71 |
| $SiO_2$ | 2.10 | 2.30 | 2.00 | 1.91 | 2.00 | 2.00 | 1.00 | 1.91 | 1.91 | 1.91 | 1.91 | 2.00 | 2.68 |
| BaO | 2.03 | | | | | | | | | | | | 6.00 |
| $SnO_2$ | | | | 1.00 | | | | | | | | | |
| CuO | | | | | | | 1.00 | | | | | | |
| $Al_2O_3$ | | | | | 1.00 | | | | | | | | |
| $Na_2O$ | | | | | | | | 1.00 | | | | | |
| $Li_2O$ | | | | | | | | | 1.00 | | | | |
| CdO | | | | | | | | | | 1.00 | | | |
| $Fe_2O_3$ | | | | | | | | | | | 1.00 | | |
| $K_2O$ | | 0.50 | | | | | | | | | | | |
| CaO | | | | | | 1.00 | | | | | | | |

The manner of preparation of the foregoing lead-zinc-borate solder glass compositions is typified by the following procedures which were employed for the preparation of an uncrystallized, thermally crystalliable glass, herein indicated as Example 1, having the compositional characteristics of Composition No. 1 in TABLE II. According to such procedures, a glass corresponding to Composition No. 1 was prepared by formulating a glass batch of the following composition:

| Raw Material | Purity | Parts by Weight |
|---|---|---|
| Ceramic Read Lead | (98.7% PbO) | 62.50 |
| Zinc Oxide | (98.8% ZnO) | 10.47 |
| Barium Carbonite | (76.4% BaO) | 2.17 |
| Boric Anhydride | (98.5% $B_2O_3$) | 7.04 |
| Silica Sand | (99.9% $SiO_2$) | 1.71 |
| | | 83.87 |

The thus formulated batch composition was then melted in a platinum-lined, melting chamber operating at a temperature of about 2,250°F. Following melting, the molten glass was discharged from the melting chamber as a stream of molten glass and passed between a pair of closely spaced, water-cooled, stainless-steel rollers having a spacing therebetween set to flatten and fracture the glass into roll-crushed chips of approximately 20–25 mils in thickness.

To the roll-crushed chips of uncrystallized, thermally crystallizable glass were added fully crystallized particles in a ratioed amount corresponding to 157.5 parts by weight of crystallized particles to each one million parts by weight of uncrystallized, roll-crushed chips. The crystallized glass particles possessed a lead-zinc borate composition approximately like that of Composition No. 1 and exhibited a particle size distribution of random percentage ranging between approximately −20 and +80 mesh screen size, as determined by U.S. Series Sieve screen standards. The resulting composite admixture of crystallized glass particles and uncrystallized chips was then simultaneously milled and blended in a pebble mill of conventional type, such as a pebble mill of the type designated as a No. 3C Pebble Mill by Paul O. Abbe, Inc. of Little Falls, N.J., and using as the pebble mill grinding media, 13/16 inch by 13/16 inch high density alumina cylinders. The milling and blending was continued in this manner about 40 minutes and produced a resultant, highly uniform blend of crystallized and uncrystallized glass particles having an overall particle size distribution such that essentially 100 percent by weight of the blended particles were of −100 U.S. Series Sieve screen size and such that between 65–78 percent by weight of the blended particles were of −400 U.S. Series Sieve screen size. This blend then constituted a master blend, and will herein be designated as Master Blend No. 1, with which to impart precise crystallization and flow characteristics to other quantities of uncrystallized glass of similar constituent oxide composition.

From Master Blend No. 1 representative samples were withdrawn and separately added to several batches of finely comminuted, uncrystallized particles of thermally crystallizable glass having constituent oxide composition corresponding to that of the uncrystallized portion of the master blend from which the sample was taken e.g. Composition No. 1. Additionally, each of the various batches of finely comminuted, uncrystallized glass possessed, as a result of being previously milled in a pebble mixer, a particle size distribution like that of the master blend, namely a particle size distribution such that essentially all of the uncrystallized particles were of −100 U.S. Series Sieve screen size and such that between about 65 and 78 percent by weight of the uncrystallized particles were of −400 U.S.

Series Sieve screen size. Still further the crystallization rate and flow rate, as determined respectively by differential thermal analysis (D.T.A.) and button flow (B.F.) procedures to be subsequently described, were determined for the batch of uncrystallized glass particles and are set forth subsequently in TABLE III under the designation Unmodified Standard No. 1.

The amount of master blend sample added to the various batches of uncrystallized glass was purposely varied for comparative purposes and the nature of such variations are exemplified in Examples 1, 2 and 3, hereinafter.

The resultant blended admixture of master blend and "unmodified standard" will for definitive purposes be referred to in each instance as a product blend.

EXAMPLE 1

For purposes of Example 1, a representative sample of Master Blend No. 1, was, as indicated above, thoroughly blended for between about 30 and 60 minutes with uncrystallized particles of thermally crystallizable glass having a composition corresponding to Composition 1 shown in TABLE II, and having a particle size distribution such that essentially all of the particles were less than 100 mesh screen size and such that between about 65 and 78 weight percent were less than 325 mesh screen size, as determined by U.S. Series Sieve screens. The amount of master blend and the amount of unmodified standard were selected so as to provide a resultant blend, or "Product Blend No. 1," containing 0.736 parts of thermally crystallized glass particles for each one million parts of uncrystallized particles of thermally crystallizable glass.

The Button flow (B.F.) characteristics and the differential thermal analysis (D.T.A.) characteristics were then determined and these characteristics are set forth in TABLE III and show a significant reduction in flow characteristics together with a significant increase in crystallization rate.

EXAMPLE 2

Following the same procedures given with respect to Example 1, except for the relative proportionate amounts of master blend and unmodified standard, sufficient amounts of Master Blend No. 1 and Unmodified Standard No. 1 were uniformly blended together to produce Product Blend No. 2 containing 3.679 parts of thermally crystallized glass for each one million parts of uncrystallized particles of thermally crystallizable glass.

The D.T.A. and B.F. characteristics corresponding to Example 2 were then determined and are designated in TABLE III as the characteristics for Product Blend No. 2.

EXAMPLE 3

Example 3 also followed the blending procedures of Example 1 with the exception that the proportionate blending of Master Blend No. 1 and unmodified Standard No. 1 was productive of a product blend containing 6.621 parts of thermally crystallized particles for each one million parts of uncrystallized particles of thermally crystallizable glass. The D.T.A. and B.F. characteristics were similarly determined and are also reported in TABLE III as the characteristics for Product Blend No. 3.

TABLE III

|  | B.F. (± 0.001 inches) | D.T.A. (± 2 minutes |
| --- | --- | --- |
| Unmodified Standard No. 1 | 1.200 | 42 |
| Product Blend No. 1 | 1.191 | 41 |
| Product Blend No. 2 | 1.147 | 35 |
| Product Blend No. 3 | 1.098 | 28 |

Upon the basis of the results obtained from the foregoing examples, as well as numerous other similar examples, it was determined that a precise predictability of the effect of the addition of known proportionate amounts of thermally crystallized glass particles is obtained when the proper procedures such as those disclosed above, are followed to produce a highly uniform finely comminuted blend of the crystallized particles with uncrystallized particles of thermally crystallizable glass. Examplary of such predictability, Product Blend Nos. 4, 5, and 6 constitute, respectively, examples of other various glass compositions randomly selected from the glass compositions set forth in TABLE II which were processed in accordance with the foregoing procedures and had varying proportionate amounts of thermally crystallized glass particles added. The relationship between the D.T.A. and B.F. characteristics and the amounts of the added crystallized glass particles in parts per million parts of uncrystallized particles of thermally crystallizable glass in the resultant "product blend" for each is indicated in TABLE IV. Additionally, as with preceding Examples 1, 2 and 3, the D.T.A. and B.F. characteristics of the uncrystallized particles of thermally crystallizable glass for each of the glass compositions of Examples 4, 5 and 6 are indicated respectively in TABLE IV, as Unmodified Standard No. 1, 2, 3 and 4.

TABLE IV

|  | Crystallized Particles (Parts per million parts of uncrystallized particles) | B.F. ± 0.001 Inches | D.T.A. ± 2 minutes |
| --- | --- | --- | --- |
| Unmodified Standard No. 2 | — | 1.160 | 34 |
| Product Blend No. 4 | 1.362 | 1.130 | 31 |
| Unmodified Standard No. 3 | — | 1.190 | 40 |
| Product Blend No. 5 | 4.414 | 1.123 | 30 |
| Unmodified Standard No. 4 | — | 1.210 | 42 |
| Product Blend No. 6 | 4.525 | 1.140 | 32 |

In the preparation of the fully crystallized particles, for use according to the present invention, finely comminuted particles of thermally crystallizable glass having a composition approximately like Composition No. 1 were spread, as a layer of about 1/16 inches in thickness, onto a stainless steel surface and fired to a fully crystalline condition in an air atmosphere for two hours at a temperature of 852°F. The crystalline material was then broken loose from the stainless steel surface and crushed in a conventional Carver Laboratory Press. The resultant crushed particles of essentially fully crystallized material was then screened to provide a screened product having a particle size between −20 and +80 U.S. Series Sieve screen size.

In determining the crystallization rates of the unmodified standards as well as the product blends, the differential thermal analysis was conducted in accordance with procedures well-established in the art, using a DuPont 900 Differential Thermal Analyzer (manufactured by E. I. duPont & Company, Inc., Wilmington, Del.) to chart on a time vs. temperature basis the time duration, in minutes, for the material to crystallize while isothermally subjected to a temperature of 445°C.; the time at which thermal crystallization occurs being readily discernible on the graph in the form of a sharp exothermic peak representing the release of the heat of crystallization of the material being tested.

The flow characteristics which have been represented herein as "button flow" or B.F. characteristics are also the results obtained by testing procedures well-established in the art. Such testing procedures involve pressing a 10 gram sample of the material to be tested into a ¾ inch diameter button by placing the material in ¾ inch diameter cylindrical cavity mold and pressing the material therein under a pressure of 1000 p.s.i.

The press molded button is then fired by subjecting it to a temperature elevation of 7-½°C. per minute up to a temperature of 450°C., after which the molded button is maintained under exposure to a temperature of 450°C. for a period of 60 minutes, followed by cooling of the button at a rate of 1°C. per minute. The button is then measured to determine the average diameter which constitutes the button flow or B.F. in inches for the thermally crystallizable material so tested. Hence, the B.F. results shown in the foregoing tables are the average resultant diameters of buttons tested in accordance with the above-described procedures.

Upon the basis of the foregoing it has been found that variations in crystallization rates and flow rates which regularly occur during the manufacture of thermally crystallizable glasses can be off-set by preparing such thermally crystallizable glasses in finely comminuted form and by uniformly blending therewith minute amounts of finely comminuted, crystallized particles of thermally crystallizable glass. As indicated, the amount of crystallized particles are blended into the final product blend by step-wise blending and in amounts such as to constitute only between 1 and 10, or more preferably 2 and 7 parts by weight of crystallized particles for each one million parts by weight of uncrystallized particles of thermally crystallizable glass. Moreover, the effect of the amount of the crystallized particles employed appears to be readily and precisely predictable irrespective of the constitute oxide composition of either the thermally crystallizable glass or the crystallized particles, especially when the compositions are lead-zinc borate glass compositions within the compositional ranges set forth in TABLE I.

Consequently, through the practice of the present invention precise uniformity and control of the crystallization rates and flow rates of thermally crystallizable glasses is obtainable and such glasses are more suitable for applications wherein precise operating techniques and procedures are desirable or necessary.

I claim:

1. A thermally crystallizable glass composition consisting essentially of a uniform blend of finely comminuted, crystallized and uncrystallized particles of thermally crystallizable glass, said crystallized particles and said uncrystallized particles being present in said glass in a relative ratio of between 100 and 225 parts by weight of crystallized glass particles for each million parts by weight of uncrystallized glass particles, said glass composition being for use in blending with additional uncrystallized glass in particulate form in the ratio of 1 to 10 parts for each million parts by weight of additional uncrystallized glass in order to reduce the crystallization and flow rate of the uncrystallized glass in a controlled manner within predictable and predetermined limits whereby the resulting glass has precisely predictable thermal crystallization and flow rates, and wherein said crystallized glass particles and said uncrystallized glass particles are of a particle size such that all of the particles are less than 100 mesh screen size, and further wherein between about 65 and 78 percent by weight of the uncrystallized glass and crystallized glass particles are less than 325 U.S. Series Sieve screen size.

2. A thermally crystallizable glass composition as defined in claim 1 consisting essentially of a uniform blend of finely comminuted particles of crystallized glass and uncrystallized particles of thermally crystallizable glass, said crystallizable glass and said crystallized glass each consisting essentially of the following constituents within the following indicated ranges of percents by weight:

| Constituent Oxides | Percent by Weight |
|---|---|
| PbO | 70 – 82 |
| $B_2O_3$ | 5 – 15 |
| ZnO | 7 – 20 |
| $SiO_2$ | 1 – 10 |
| $Al_2O_3$ | 0 – 5 |
| Other compatible glass forming constituents: with no single constituent exceeding ten (10) percent by weight | 0 – 17. |

3. A thermally crystallizable glass composition consisting essentially of a uniform blend of finely comminuted, crystallized and uncrystallized particles of thermally crystallizable glass said crystallized glass particles and said uncrystallized glass particles being present in said composition in a ratio of 1 to 10 parts by weight of particles of crystallized glass to each one million parts by weight of uncrystallized particles of thermally crystallizable glass, said composition having a particle size distribution such that essentially all of said particles are of −100 U.S. Series Sieve screen size, and further wherein between about 65–78 percent by weight of the uncrystallized glass and crystallized glass particles are less than 325 U.S. Series Sieve screen size, said crystallized glass particles being present in an amount to reduce the crystallization and flow rates of the uncrystallized glass within predictable and predetermined limits whereby the resulting glass composition has precisely predictable thermal crystallization and flow rates.

4. A method of tailoring the crystallization rate and flow rate characteristics of a thermally crystallizable glass comprising the steps of:

providing a quantity of uncrystallized, thermally crystallizable glass;

comminuting said uncrystallized, thermally crystallizable glass into particles having a particle size distribution such that essentially all of the particles possess a particle size of −100 mesh screen size and such that between about 65 and 78 weight percent of the particles possess a particle size of −325 mesh screen size;

providing a quantity of thermally crystallized glass;

comminuting said thermally crystallized glass into particles having a particle size distribution such that essentially all of the particles possess a particle size of −100 mesh screen size and such that between about 65 and 78 weight percent of the particles possess a particle size of −325 mesh screen size;

uniformly blending said particles of crystallized glass and said particles of uncrystallized, thermally crystallizable glass together into a master blend in a ratio of between 100 and 225 parts by weight of particles of crystallized glass to each one million parts by weight of particles of uncrystallized glass.

5. The method, as defined in claim 4, wherein said step of providing a quantity of uncrystallized, thermally crystallizable glass includes providing same as a lead-zinc borate glass.

6. The method, as defined in claim 4, including the further steps of:

providing a second quantity of particles of uncrystallized, thermally crystallizable glass having a particle size distribution such that essentially all of the particles possess a particle size of −100 mesh screen size and such that between about 65 and 78 weight percent of the particles possess a particle size of −325 mesh screen size;

uniformly blending said master blend with said second quantity of particles of uncrystallized, thermally crystallizable glass in an amount productive of a product blend having a ratio of 1–10 parts by weight of particles of crystallized glass to each one million parts by weight of particles of uncrystallized glass.

* * * * *